United States Patent
Xu

(10) Patent No.: US 7,826,240 B2
(45) Date of Patent: Nov. 2, 2010

(54) ADAPTER CONNECTION STRUCTURE

(75) Inventor: Ming Xu, Blacksburg, VA (US)

(73) Assignee: FSP Technology Inc., Taoyuan County (TW)

( * ) Notice: Subject to any disclaimer, the term of this patent is extended or adjusted under 35 U.S.C. 154(b) by 177 days.

(21) Appl. No.: 12/147,103

(22) Filed: Jun. 26, 2008

(65) Prior Publication Data

US 2009/0323382 A1    Dec. 31, 2009

(51) Int. Cl.
*H02M 1/10* (2006.01)
*H02M 1/00* (2006.01)

(52) U.S. Cl. ...................... 363/142; 363/146

(58) Field of Classification Search ............... 363/146, 363/142, 65
See application file for complete search history.

(56) References Cited

U.S. PATENT DOCUMENTS

| | | | | |
|---|---|---|---|---|
| 5,715,156 A * | 2/1998 | Yilmaz et al. | | 363/142 |
| 5,818,705 A * | 10/1998 | Faulk | | 363/48 |
| 5,844,790 A * | 12/1998 | Jacobs et al. | | 363/47 |
| 5,901,056 A * | 5/1999 | Hung | | 363/142 |
| 5,940,282 A * | 8/1999 | Oglesbee | | 363/146 |
| 6,172,891 B1 * | 1/2001 | O'Neal et al. | | 363/146 |
| 6,459,604 B1 * | 10/2002 | Youn et al. | | 363/142 |
| 6,643,158 B2 * | 11/2003 | McDonald et al. | | 363/142 |
| 6,903,950 B2 * | 6/2005 | Afzal et al. | | 363/142 |
| 6,972,975 B2 * | 12/2005 | Su | | 363/146 |
| 7,190,091 B1 * | 3/2007 | Marshall | | 307/26 |
| 7,477,533 B2 * | 1/2009 | Gilliland | | 363/72 |
| 7,502,233 B2 * | 3/2009 | Kim et al. | | 363/16 |

\* cited by examiner

*Primary Examiner*—Shawn Riley
(74) *Attorney, Agent, or Firm*—Jianq Chyun IP Office

(57) ABSTRACT

An adapter connection structure, which includes a first converter and a second converter. The first converter is connected to at least one input terminal to receive an input power and converts the input power into a transitional power. The second converter is connected to the first converter via a transit cable to transmit the transitional power, converts the transitional power into a DC output power and outputs the DC output power via a DC power cable. As the transitional power transmitted from the first converter to the second converter is in the form of a high-voltage and high-frequency AC power or a high-voltage DC power, the power transmission loss in the transit cable is reduced. Therefore, the present invention reduces transmission loss.

14 Claims, 6 Drawing Sheets

ADAPTER CONNECTION STRUCTURE

FIELD OF THE INVENTION

The present invention relates to an adapter connection structure, particularly to an improved architecture and connection relationship of an adapter providing power to drive the electronic device.

BACKGROUND OF THE INVENTION

Most of electronic devices need stable power supply. However, only a larger-size device, such as a personal computer or a further lager system, has a built-in power supply device. A smaller-size device or a portable device needs an adapter to receive power. One end of the adapter is connected to a city power, and the other end is connected to a connector to output a DC (Direct Current) power. Refer to FIG. 1 for a conventional adapter 90, which may be a mobile phone charger or a DC power plug for a small-size electric appliance. The adapter 90 comprises an AC/DC converter 91 and a DC power cable 92. The AC/DC converter 91 has at least one conduction terminals 911. The AC/DC converter 91 receives an AC (Alternating Current) power via the conduction terminal 911 plugged into a socket. Then, the AC/DC converter 91 converts the AC power into a DC power of a rated voltage and a rated current. The DC power is transmitted to an electronic device via an output terminal 93 at the end of the DC power cable 92. Refer to FIG. 2 for another conventional adapter 80, which may be a notebook computer adapter. The adapter 80 has an AC/DC converter 81, and two ends of the AC/DC converter 81 are respectively connected with an AC power cable 84 and a DC power cable 85. The AC power cable 84 has an input terminal 82 at one end thereof, and the DC power cable 85 has an output terminal 83 at one end thereof. The AC power cable 84 and DC power cable 85 may respectively have electromagnetic wave filters 86. The AC/DC converter 81 receives an AC power via the AC power cable 84. Then, the AC/DC converter 81 converts the AC power into a DC power. The DC power is output via the DC power cable 85. In the abovementioned conventional adapters, the DC power cable 85/92 between the AC/DC converter 81/91 and the output terminal 83/93 is used to transmit a lower-voltage DC power. For transmitting a given value of power, a lower-voltage DC power needs a higher current than a higher-voltage DC power and has a higher transmission loss than a higher-voltage DC power. The longer the DC power cable 85/92, the greater the transmission loss. Therefore, the length of the DC power cable 85/92 should be limited below a rational value in designing the adapter 80/90. Otherwise, the voltage of the output terminal 83/93 will be lower than the rated voltage because of transmission loss. However, the DC power cable 85/92 needs an appropriate length to transmit power from the AC/DC converter 81/91 to an electronic device. Thus, the DC power cable 85/92 has to adopt a high-quality cable to reduce the transmission loss of DC power. Then, the cost is increased. Those described above are the conventional problems the present invention intends to overcome.

SUMMARY OF THE INVENTION

One objective of the present invention is to provide an adapter connection structure to reduce the influence of cable length on DC output, whereby the length of a DC power cable will not be confined to below a given value, or even the length of a DC power cable can be extended without increasing transmission loss.

The present invention proposes an adapter connection structure. The adapter comprises a first converter and a second converter. The first converter receives an input power via an input terminal and converts the input power into a transitional power. The transitional power is transmitted from the first converter to the second converter via a transit cable. The second converter converts the transitional power into a DC output power. The DC output power is output via a DC power cable. The second converter is arranged to adjoin the output terminal as much as possible to minimize the length of the DC power cable and then minimize the transmission loss. The first converter converts the input power into a transitional power, and the transitional power may be a high-voltage and high-frequency AC power or a high-voltage DC power. The high-voltage and high-frequency transitional power will be converted into a rated output DC power by the second converter. Because of high frequency and high voltage, the transitional power has less transmission loss in the transit cable. Thereby, not only transmission loss is decreased, but also the cable can adopt a less expensive one. Therefore, the entire cost of buying and using an adapter is reduced.

DETAILED DESCRIPTION OF THE PREFERRED EMBODIMENTS

Below, the technical contents of the present invention are described in detail in cooperation with the drawings.

An adapter connection structure of the present invention comprises a first converter and a second converter. The first converter is connected to at least one input terminal to receive a input power and converts the input power into a transitional power. The second converter is connected to the first converter via a transit cable to receive the transitional power and converts the transitional power into a DC output power. Then, the DC output power is output from an output terminal. Below are to be described several embodiments of the present invention.

Figure 1:
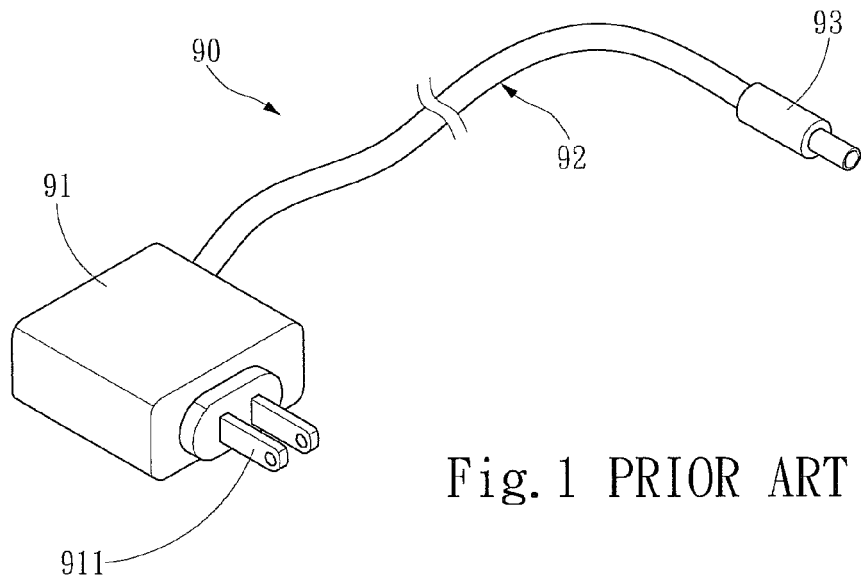
FIG. 1 is a diagram schematically showing a conventional adapter.
Figure 2:
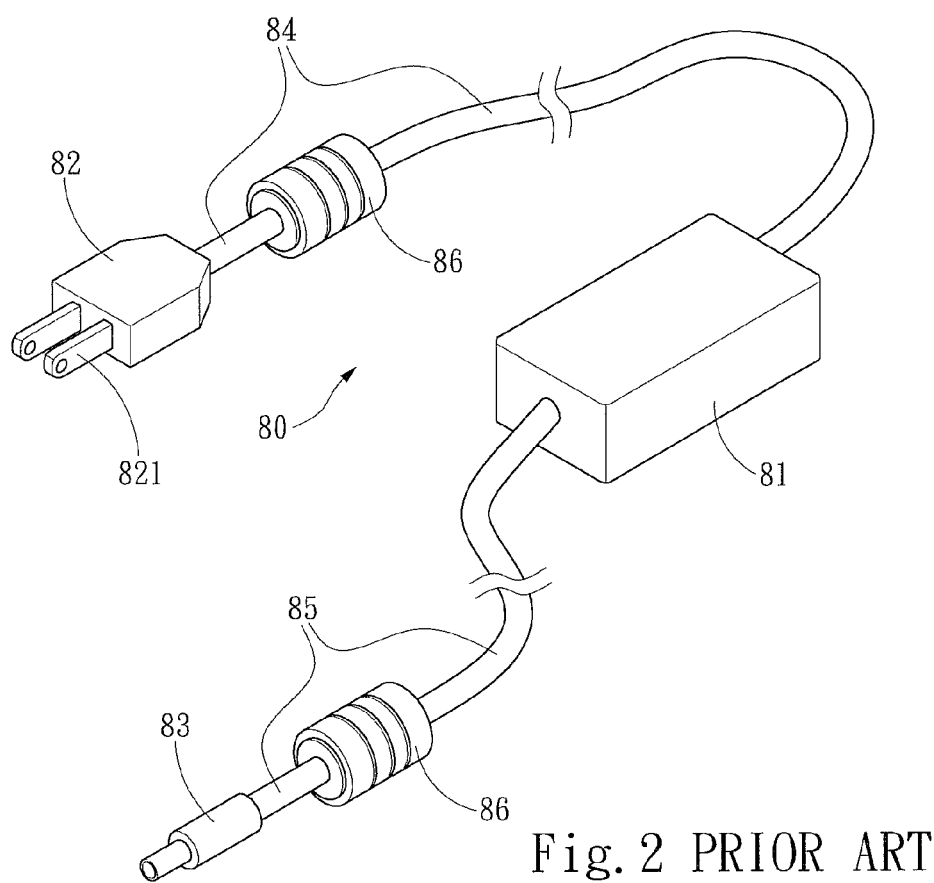
FIG. 2 is a diagram schematically showing another conventional adapter.
Figure 3:
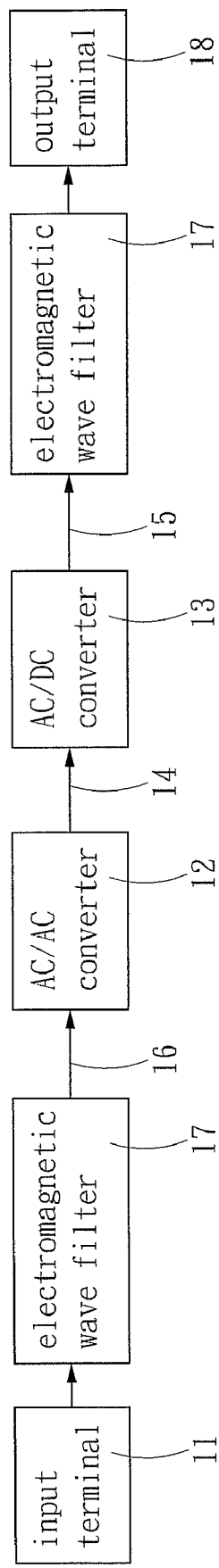
FIG. 3 is a block diagram of an adapter connection structure according to a first embodiment of the present invention.
Figure 4:
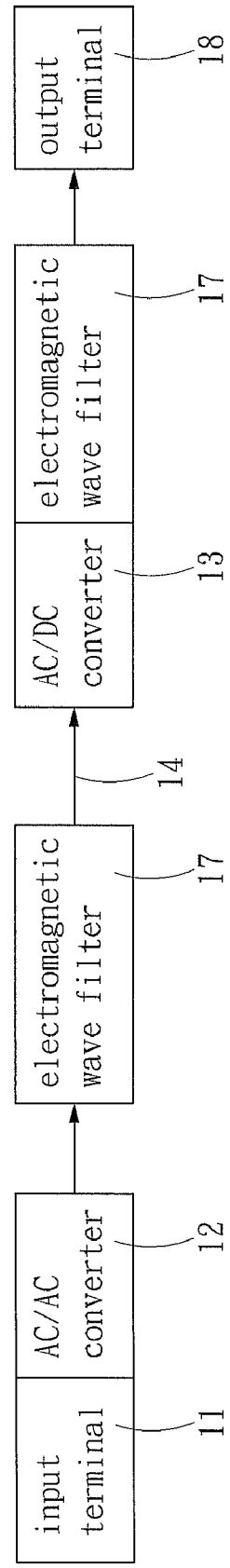
FIG. 4 is a block diagram of an adapter connection structure according to a second embodiment of the present invention.

Refer to FIG. 3 for a first embodiment of the present invention. In this embodiment, the adapter has an input terminal 11, and an AC input power is received from the input terminal 11 and transmitted to the first converter via an AC power cable 16. In this embodiment, the first converter is an AC/AC converter 12. The AC/AC converter 12 converts the AC input power into the transitional power and transmits the transitional power to the second converter via the transit cable 14. In this embodiment, the second converter is an AC/DC converter 13. The AC/DC converter 13 converts the transitional power into a DC output power of a rated voltage and a rated current and outputs the DC output power from an output terminal 18. The AC/DC converter 13 is connected to the output terminal 18 via a DC power cable 15. Two electromagnetic wave filters 17, which can filter out electromagnetic wave and noise, are respectively arranged between the input terminal 11 and the first converter and between the second converter and the output terminal 18. As the transitional power transmitted from the AC/AC converter 12 to the AC/DC converter 13 is in form of an AC power, the power transmission loss in the transit cable 14 is much less than that in the conventional DC current transmission. Thus, the transmission loss is reduced. Refer to FIG. 4 for a second embodiment of the present invention. The adapter of this embodiment still comprises the input terminal 11, the AC/AC converter 12, the AC/DC converter 13, and the transit cable 14 connecting the AC/AC converter 12 and the AC/DC converter 13. However, the AC/AC converter 12 and the input terminal 11 are integrated into a one-piece component. Thus, the AC/AC converter 12 and the input terminal 11 seem a plug-like object in appearance. Further, the AC/DC converter 13 and the electromagnetic wave filter 17 near the output terminal 18 are also integrated into a one-piece component.

Figure 5:
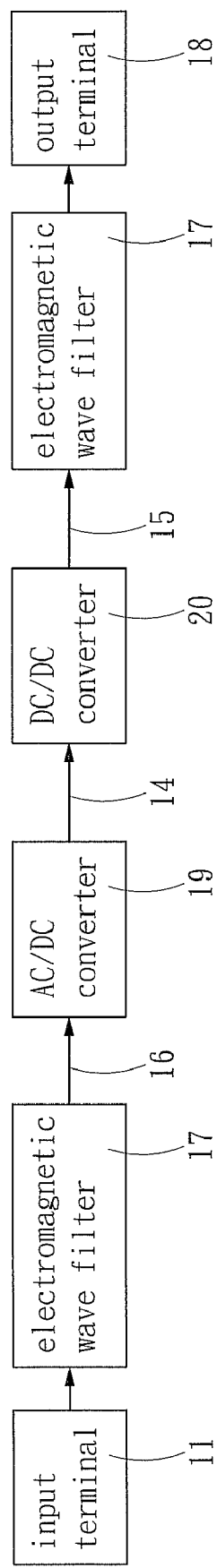
FIG. 5 is a block diagram of an adapter connection structure according to a third embodiment of the present invention.
Figure 6:
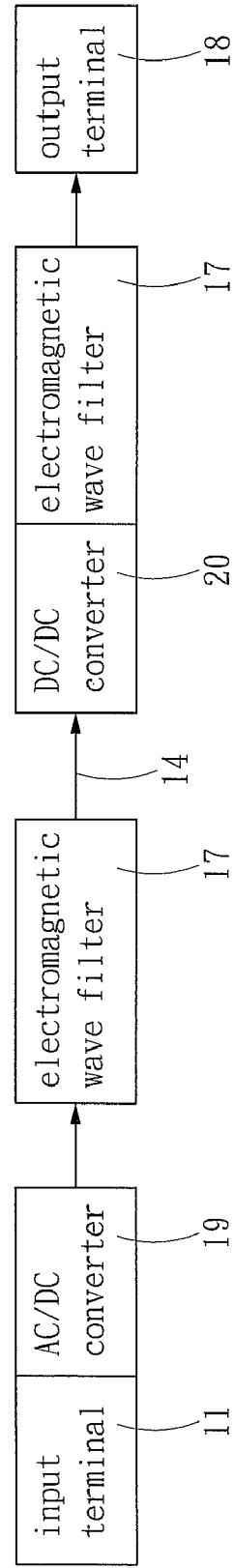
FIG. 6 is a block diagram of an adapter connection structure according to a fourth embodiment of the present invention.

Refer to FIG. 5 for a third embodiment of the present invention. In this embodiment, the adapter also has the input terminal 11, and the AC input power is also received from the input terminal 11 and transmitted to the first converter via the AC power cable 16. However, the first converter is an AC/DC converter 19 in this embodiment. The AC/DC converter 19 outputs the transitional power having a voltage higher than the rated output voltage. As the transitional power having a voltage higher than the rated output voltage, the transitional power has a smaller current. Thus, the transmission loss is less than that of the conventional technologies. The AC/DC converter 19 transmits the transitional power to the second converter via the transit cable 14. Corresponding to the AC/DC converter 19, the second converter is a DC/DC converter 20 in this embodiment. The DC/DC converter 20 converts the high-voltage transitional voltage into a DC output power of a rated voltage and a rated current. Then, the DC output power is output via the DC power cable 15 and the output terminal 18. In this embodiment, the abovementioned AC power cable 16 and DC power cable 15 also respectively have electromagnetic wave filters 17. Refer to FIG. 6 for a fourth embodiment of the present invention. Similar to the second embodiment, the AC/DC converter 19 and the input terminal 11 are integrated into a one-piece component having a plug-like appearance.

Figure 7:
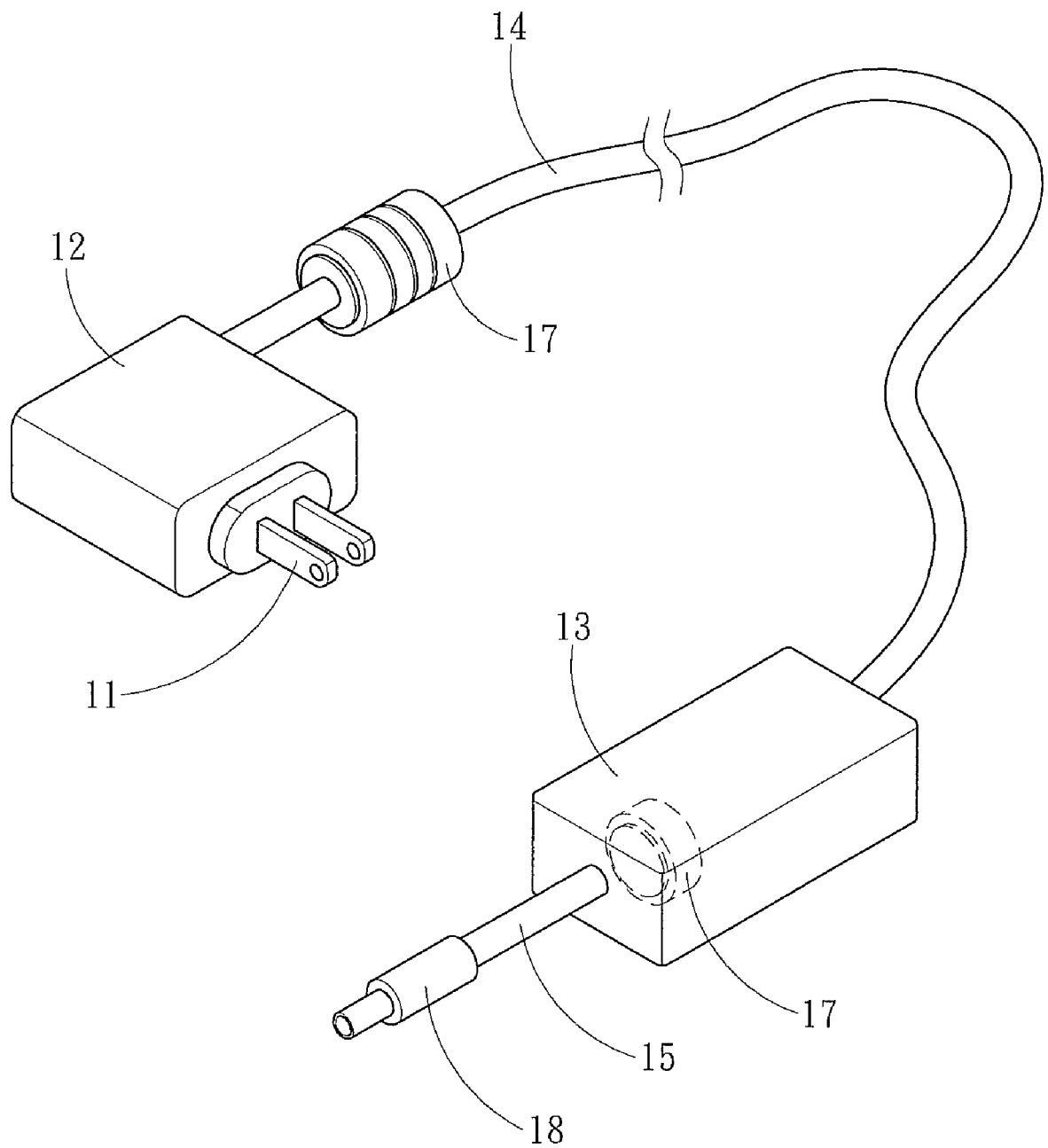
FIG. 7 is a perspective view of the second embodiment shown in FIG. 4.

Refer to FIG. 7 is a perspective view of the second embodiment shown in FIG. 4, wherein the AC/AC converter 12 and the input terminal 11 are integrated into a one-piece component having a plug-like appearance, and the AC/DC converter 13 and the electromagnetic wave filter 17 are also integrated into a one-piece component. The AC/AC converter 12 receives the input power and converts the input power into the transitional power and transmits the transitional power to the AC/DC converter 13 via the electromagnetic wave filter 17 and the transit cable 14. Then, the AC/DC converter 13 generates the DC output power.

Figure 8:
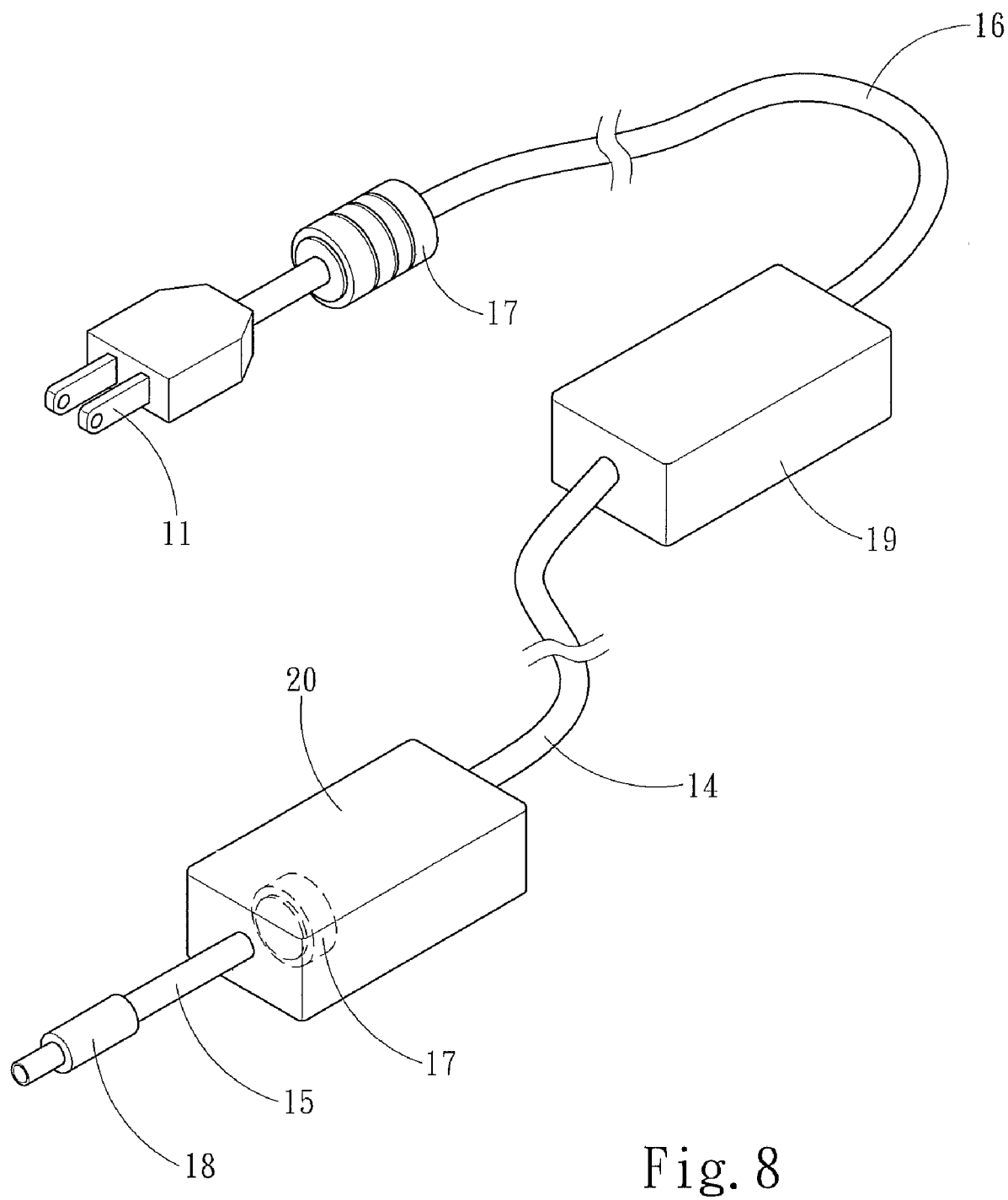
FIG. 8 a perspective view of an adapter connection structure according to a fifth embodiment of the present invention.
Figure 9:
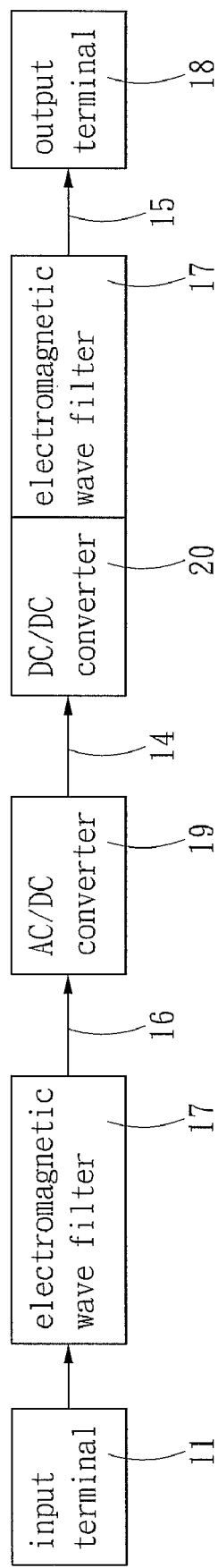
FIG. 9 is a block diagram of the fifth embodiment shown in FIG. 8.

Refer to FIG. 8 and FIG. 9 are respectively a perspective view and a block diagram of a fifth embodiment extended from the abovementioned embodiments. In this embodiment, the AC/DC converter 19 functioning as the first converter also receives the input power from the input terminal 11 and converts the input power into the transitional power and transmits the transitional power to the second converter via the transit cable 14. In this embodiment, the DC/DC converter 20 functions as the second converter and is integrated with the electromagnetic wave filter 17 to form a one-piece component. The DC/DC converter 20 is arranged to adjoin the output terminal 18 as much as possible to shorten the DC power cable 15 and reduce the transmission loss in the DC power cable 15.

The structure of the present invention is distinct from the conventional adapters in that the structure of the present invention comprises the first converter and the second converter, which are separated from each other. The transitional power transmitted between the first converter and the second converter is in form of a high-voltage and high-frequency AC power or a high-voltage DC power, and the transitional power has a peak voltage over 1.5 times higher than that of the DC output power, whereby the transmission loss is reduced, and the cost of power cables is decreased. The second converter is arranged to adjoin the output terminal 18 as much as possible to minimize the length of the DC power cable 15. Further, the electromagnetic wave filter 17 may be integrated with the first or second converter in the present invention. The present invention has been described above in detail with the embodiments. However, the embodiments are only to exemplify the present invention but not to limit the scope of the present invention. Therefore, any equivalent modification or variation according to the spirit of the present invention is to be also included within the scope of the present invention, which is based on the claims stated below.

From the above description, it is known that the present invention has improvements over the prior arts. Therefore, the present invention possesses novelty and non-obviousness and meets the conditions for a patent. Thus, the Inventor files the application for a patent. It will be appreciated if the patent is approved fast.

What is claimed is:

1. An adapter device connection structure comprising
a first adapter device, connected to at least one input terminal to receive an input power, and converting said input power into a transitional power;
a second adapter device, connected to said first adapter device via a transit cable to receive said transitional power, converting said transitional power into a DC (Direct Current) output power, and outputting said DC output power from an output terminal; and
a DC power cable, connecting said second adapter device converter and said output terminal, and conducting said DC output power from said second adapter device converter to said output terminal;
wherein said first and second adapter devices are an AC/AC adapter and a AC/DC adapter, respectively, so as to reduce a power transmission loss in said transit cable.

2. The adapter connection structure according to claim 1, wherein said input terminal is installed in said first adapter device converter.

3. The adapter connection structure according to claim 1, wherein said input terminal is connected to said first adapter device via an AC (Alternating Current) power cable.

4. The adapter connection structure according to claim 1, wherein said transitional power has a peak voltage over 1.5 times higher than that of said DC output power.

5. The adapter connection structure according to claim 1, wherein at least one electromagnetic wave filter is arranged between said first adapter device and said input terminal, and between said second adapter device and said output terminal.

6. The adapter connection structure according to claim 5, wherein said electromagnetic wave filters are respectively integrated with said first adapter device and said second adapter device.

7. The adapter connection structure according to claim 1, wherein said second adapter device converter is connected to said output terminal via a DC power cable.

8. An adapter device connection structure comprising
a first adapter device, connected to at least one input terminal to receive an input power, and converting said input power into a transitional power;
a second adapter device, connected to said first adapter device via a transit cable to receive said transitional power, converting said transitional power into a DC (Direct Current) output power, and outputting said DC output power from an output terminal; and
a DC power cable, connecting said second adapter device and said output terminal, and conducting said DC output power from said second adapter device to said output terminal;
wherein said first and second adapter devices are an AC/DC adapter and an DC/DC adapter respectively, and said transitional power output by said AC/DC adapter has a voltage higher than that of said DC output power so as to reduce the power transmission loss in said transit cable.

9. The adapter connection structure according to claim 8, wherein said input terminal is installed in said first adapter device.

10. The adapter connection structure according to claim 8, wherein said input terminal is connected to said first adapter device via an AC (Alternating Current) power cable.

11. The adapter connection structure according to claim 8, wherein said transitional power has a peak voltage over 1.5 times higher than that of said DC output power.

12. The adapter connection structure according to claim 8, wherein at least one electromagnetic wave filter is arranged between said first adapter device and said input terminal, and between said second adapter device and said output terminal.

13. The adapter connection structure according to claim 12, wherein said electromagnetic wave filters are respectively integrated with said first adapter device and said second adapter device.

14. The adapter connection structure according to claim 8, wherein said second adapter device is connected to said output terminal via a DC power cable.

* * * * *